United States Patent [19]

Yamakawa et al.

[11] 4,150,541
[45] Apr. 24, 1979

[54] EXHAUST GAS CLEANING APPARATUS OF AN INTERNAL COMBUSTION ENGINE

[75] Inventors: Yoshio Yamakawa, Toyota; Yoshiki Fukumori, Obu, both of Japan

[73] Assignees: Toyota Jidosha Kogyo Kabushiki Kaisha, Toyota; Aisan Industry Co., Ltd., Obu, both of Japan

[21] Appl. No.: 835,691

[22] Filed: Sep. 22, 1977

[30] Foreign Application Priority Data

Jul. 1, 1977 [JP] Japan .................................. 52-77817

[51] Int. Cl.² .............................................. F01N 3/15
[52] U.S. Cl. ........................................ 60/276; 60/290
[58] Field of Search ................................. 60/276, 290

[56] References Cited

U.S. PATENT DOCUMENTS

| 3,738,109 | 6/1973 | Tatsutomi | 60/290 |
| 3,962,867 | 6/1976 | Ikeura | 60/276 |

*Primary Examiner*—Douglas Hart
*Attorney, Agent, or Firm*—Stevens, Davis, Miller & Mosher

[57] ABSTRACT

Disclosed is an exhaust gas cleaning apparatus of an internal combustion engine, provided with a three-way catalytic converter and a vacuum-operated flow control valve. The flow control valve has a diaphragm for controlling the amount of secondary air directed into an exhaust manifold of the engine for the effective operation of the three-way catalytic converter. In order to move the diaphragm to increase or decrease the amount of secondary air, a vacuum chamber is formed on one side of the diaphragm. This vacuum chamber is opened to a vacuum port formed in the intake system of the engine for transmitting the vacuum signal from the port to the vacuum chamber. Further, in order to maintain a constant rate of movement of the diaphragm irrespective of the vacuum level at the port, means are provided for transmitting a vacuum signal from the port to another vacuum chamber formed on the other side of the diaphragm.

3 Claims, 4 Drawing Figures (LOW LOAD)

(HIGH LOAD)

EXHAUST GAS CLEANING APPARATUS OF AN INTERNAL COMBUSTION ENGINE

FIELD OF THE INVENTION

The present invention relates to an exhaust gas cleaning apparatus for an internal combustion engine, which includes a three-way catalytic converter arranged in the exhaust system of the engine.

BACKGROUND OF THE INVENTION

Already known from prior art is a three-way catalytic converter which can clean three major toxic components (HC, CO and $NO_x$) in the exhaust gas. The operation of the three-way catalytic converter is effectively attained when the exhaust gas is in a state wherein excess air as well as excess fuel is not left in the exhaust gas, i.e., the air-fuel ratio of the exhaust gas (the ratio of air remaining in the exhaust gas to fuel remaining in the exhaust gas) is maintained near the stoichiometric value.

For maintaining the air-fuel ratio near the stoichiometric value, an air injection system has been provided in the prior art for controlling the amount of secondary air introduced into the exhaust manifold in accordance with electrical signals transmitted from an oxygen-concentration-cell type air-fuel sensor, for example, an $O_2$ sensor which is arranged in an exhaust pipe of the engine. This air injection system has a vacuum-operated flow control valve which includes a spring-urged diaphragm which forms a vacuum chamber on one side thereof. To this chamber, a vacuum signal is selectively introduced from the intake manifold of the engine in accordance with the electrical signals of the $O_2$ sensor. Thus, a vacuum force, which is increased or decreased in accordance with the electrical signals, is generated on the diaphragm for controlling the amount of the secondary air directed to the exhaust manifold.

However, the above described known system exhibits a drawback wherein the rate of increase in the vaccum force of the diaphragm is not maintained at a constant value during all engine load conditions, since the vacuum level in the intake manifold of the engine decreases in accordance with an increase in the load of the engine, i.e., an increase in the opening of a throttle valve of the engine. Thus, the rate of increase in the vacuum force of the diaphragm of the flow control valve occurring during the high load condition is lower than the rate of increase occurring during the low load condition. Consequently, the speed of change in the amount of the secondary air during the high-load condition becomes low. Therefore, due to the above reasons, an ideal air-fuel ratio control cannot be carried out, thereby causing an unsatisfactory operation of the three-way catalytic converter to occur.

SUMMARY OF THE INVENTION

An object of the present invention is to provide an exhaust gas cleaning apparatus having a vacuum-operated flow control valve, capable of maintaining a substantially constant rate of movement of the diaphragm irrespective of the engine load conditions.

According to the present invention an exhaust gas cleaning apparatus of an internal combustion engine having an intake system, an engine body and an exhaust system is provided, said apparatus comprising:

a three-way catalytic converter disposed in said exhaust system, said converter being operable for cleaning three major toxic components in the exhaust gas when an air-fuel ratio of the exhaust gas is maintained near a predetermined value;

a pipe means for introducing secondary air into said exhaust system located upstream of said three-way catalytic converter;

a vacuum-operated flow control valve device located on said pipe means, said valve device having a spring-urged diaphragm for forming a main vacuum signal chamber on one side of said diaphragm for moving said diaphragm, in accordance with a vacuum force applied thereto, to control the amount of secondary air directed to said exhaust system;

a sensor means arranged in said exhaust system for sensing the air-fuel ratio of the exhaust gas;

vacuum transmitting means responsive to electric signals from the sensor means for selectively transmitting a vacuum signal from a vacuum port formed in the intake system into said main vacuum chamber of the vacuum-operated flow control valve for controlling the vacuum level in the main vacuum chamber of the flow control valve; and vacuum introducing means for transmitting a vacuum signal from said vacuum port into a second vacuum chamber formed on the other side of said diaphragm opposite to said one side so that vacuum pressure is formed in said second chamber for maintaining a constant rate of movement of the diaphragm. Thus the amount of the secondary air directed to the exhaust system is effectively controlled to maintain the air-fuel ratio near said predetermined value.

DESCRIPTION OF A PREFERRED EMBODIMENT

Figure 1:
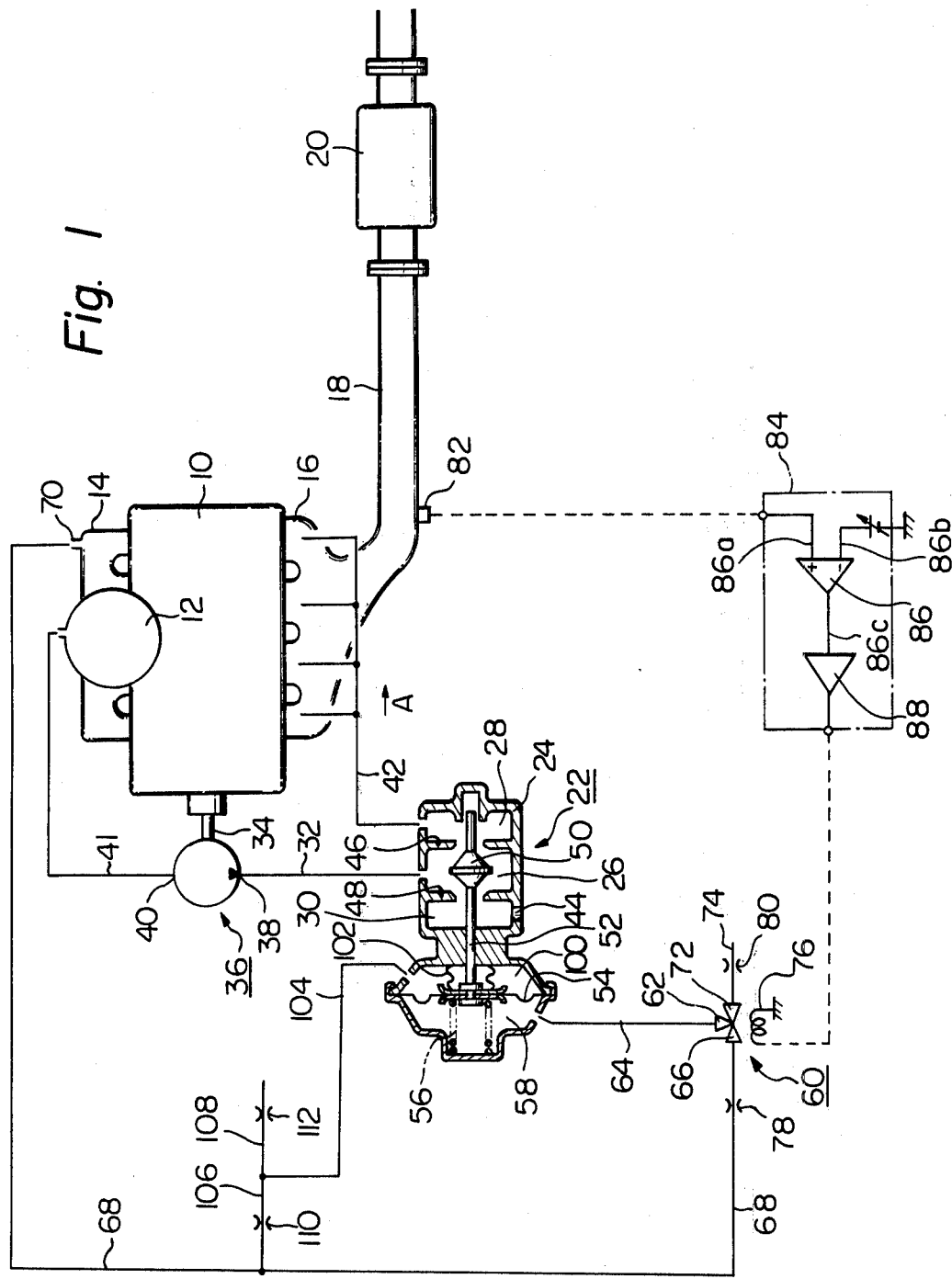
FIG. 1 is a schematic view of an exhaust gas cleaning apparatus according to the present invention.

In FIG. 1, which schematically illustrates an internal combustion engine, the numeral 10 designates an engine body. Intake air is introduced into the combustion chambers (not shown) in the engine body 10, via an air cleaner 12, a not-shown carburetor and an intake manifold 14. The resultant exhaust gas, due to the combustion in each of the combustion chambers, is introduced into an exhaust manifold 16, to which an exhaust pipe 18 is connected. A three-way catalytic converter 20 is located downstream from the exhaust pipe 18. The three-way catalytic converter 20 effectively operates to clean the three major toxic components in the exhaust gas, when the air-fuel ratio directed to the converter 20 is maintained near the stoichiometric atmosphere.

Numeral 22 indicates a vacuum-operated valve for controlling the amount of secondary air introduced into the exhaust manifold 16 in response to the vacuum pressure applied to the valve 22. The valve 22 has a body 24 which forms three air chambers 26, 28 and 30. The air chamber 26 is connected, via an air pipe 32, to an air pump 36 at an outlet 38 thereof. The pump 36 is driven by a crankshaft 34 of the engine body 10. An inlet 40 of the air pump 36 is connected via an air pipe 41 to a purified space in the air cleaner 12. Thus, an amount of secondary air from the air cleaner 12 can be introduced into the air chamber 26 by the rotation of the crankshaft 34. The air chamber 28 is connected to each branch pipe of the exhaust manifold 16 by an air injection pipe 42 for introducing the secondary air into the exhaust manifold 16. The air chamber 30 is opened to the atmosphere through a port 44 for discharging an excess amount of air therefrom. A first valve seat 46 is formed between the air chamber 26 and the air chamber 28. A second valve seat 48 is formed between the air chamber 26 and the air chamber 30. A valve member 50, for controlling the amount of air directed to the chamber 28 from the chamber 26, is situated between the first valve seat 46 and the second valve seat 48. The valve member 50 is connected via a rod 52 to a diaphragm 54 which is urged by a spring 56. Thus, the position of the valve member 50 with respect to the valve seat 46 or 48 is controlled by a vacuum force generated on the diaphragm 54.

In order to generate a vacuum force on the diaphragm 54, a vacuum signal chamber 58 is formed on one side of the diaphragm 54. The chamber 58 is connectable to a vacuum signal port 70 in the intake manifold 14 by means of a pipe system which will be fully described later.

Figure 2A:
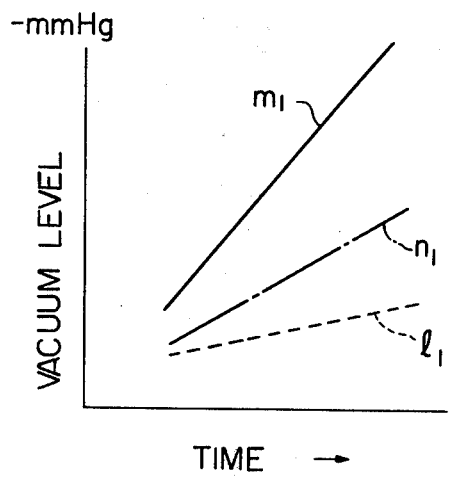
FIGS. 2a and 2b schematically show the relationship between the time and the vacuum level in the chamber 58 of FIG. 1 during a low load condition and a high load condition, respectively.
Figure 2B:
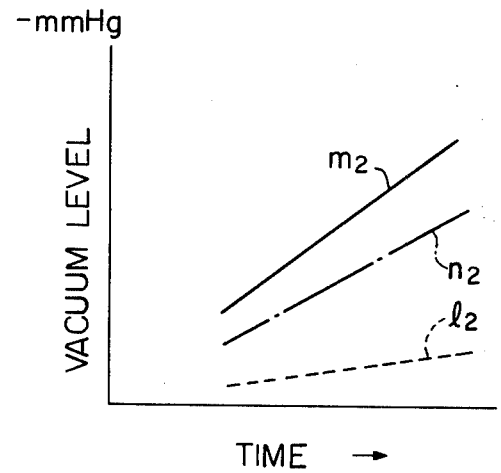

Numeral 60 designates a vacuum switching valve of an electromagnetic type for selectively connecting the chamber 58 of the flow control valve to the vacuum signal port 70 or to the atmosphere. Thus, the switching valve 60 allows control of the vacuum force on the diaphragm 54 for controlling the amount of secondary air directed to the air injection pipe 42, as shown by an arrow A in FIG. 2. The switching valve 60 has a common port 62, a first switching port 66 and a second switching port 72. The common port 62 is connected to the vacuum signal chamber 58 via a vacuum conduit 64. The first switching port 66 is connected to the vacuum signal port 70 via a vacuum signal intake conduit 68. In this conduit 68 an orifice 78 is formed in order to control the transmission speed of a vacuum signal transmitted from the port 70 to the first switching port 66. The second switching port 72 is opened to the atmosphere via an atmospheric air intake conduit 74. In the conduit 74, an orifice 80 is formed in order to control the speed of introducing the atmospheric air pressure signal from the atmosphere to the second switching port 72. The electromagnetic switching valve 60 has a solenoid 76 for operating the switching valve 60.

When the solenoid coil 76 is energized, the valve 60 is in its first position via which the common port 62 communicates with the first switching port 66. In this first position, a vacuum signal at the vacuum signal port 70 can be introduced into the vacuum signal chamber 58 of the vacuum-operated valve 22, in order to gradually increase the vacuum force applied to the diaphragm 54. This increase in the vacuum force causes the valve member 50 to be moved away from the valve seat 46, so that the amount of air directed to the air injection pipe 42, as shown by the arrow A, in increased. Because of the increase in the amount of the secondary air directed to the air-injection pipe 42, the air-fuel ratio of the exhaust gas in the exhaust pipe 18 connected to the pipe 42 becomes lean (or is increased). The rate of increase in the air-fuel ratio corresponds to the rate of movement of the valve body, in other words, to the rate of increase in the vacuum force generated on the diaphragm 54.

When the solenoid coil 76 is de-energized, the switching valve 60 is in its second position via which the common port 62 communicates with the second switching port 72. In this position, atmospheric air is introduced into the signal chamber 58 of the flow control valve 22, in order to gradually decrease the vacuum force applied to the diaphragm 54. This decrease in the vacuum force causes the valve member 50 to be moved toward the valve seat 46, so that the amount of air directed to the air injection pipe 42, as shown by the arrow A, is decreased. As a result of this decrease in the amount of secondary air directed to the exhaust pipe 18 via the air-injection pipe 42, the air-fuel ratio of the exhaust gas in the exhaust pipe 18 becomes "rich" (or is decreased).

Numeral 82 designates an oxygen-concentration-cell type sensor, for example, an $O_2$ sensor, which is disposed in the exhaust pipe for providing electric signals indicating the air-fuel ratio of the exhaust gas directed to the three-way catalytic converter 20. As is well known to those skilled in this field, the $O_2$ sensor provides a high-voltage electric signal when the air-fuel ratio of the exhaust gas is rich, and a low-voltage electric signal when the air-fuel ratio is lean.

Numeral 84 designates a control device having a comparator unit 86 electrically connected to the $O_2$ sensor 82 at an input 86a of the unit. The control device 84 further has an amplifier unit 88 which is on one end thereof connected to an output 86c of the unit 86 and is on the other end thereof connected to the solenoid coil 76 of the vacuum switching valve 60. The voltage level at another input 86b of the comparator unit 86 is lower than the high level signal from the $O_2$ sensor 82 and higher than the low level signal from the $O_2$ sensor 82. Therefore, an output pulse signal is provided at the output 86c when a high level signal, which indicates a rich air-fuel ratio of the exhaust gas in the exhaust pipe 18, is received by the input 86a. This output pulse signal is transmitted, via the amplifier unit 88, to the solenoid coil 76 for energizing the coil 76. Thus, the vacuum transmitting valve 60 is switched to its first position via which the common port 62 communicates with the first switching port 66.

When a low-level signal from the $O_2$ sensor 82, which signal indicates a lean air-fuel ratio of the exhaust gas, is received by the input 86a of the comparator unit 86, no output pulse signal is generated at the output 86c. Thus, the solenoid coil 76 is de-energized, causing the vacuum switching valve 60 to be switched to its second position via which the common port 62 communicates with the second switching port 72.

As is described hereinabove, when the air-fuel ratio of the exhaust gas directed to the three-way catalytic converter 20 is rich, the vacuum switching valve 60 is in its first position via which the common port 62 communicates with the port 66. As a result of this, the vacuum force generated on the diaphragm 54 of the flow control valve 22 is gradually increased because the orifice 78 in the conduit 68 is present. Thereby the valve member 50 is moved away from the valve seat 46. Accordingly, the amount of secondary air directed to the air-injection pipe 42, as shown by the arrow A, is increased. The air-fuel ratio in turn is increased to the stoichiometric value, thereby causing the three-way catalytic converter 20 to operate effectively. When the air-fuel ratio of the exhaust gas is lean, the vacuum switching valve 60 is in its second position via which the port 62 communicates with the second switching port 72. As a result of this, the vacuum force of the diaphragm 54 is gradually decreased because of the presence of the orifice 80. The valve member 50 is thus moved toward the valve seat 46. Accordingly, the amount of secondary air directed to the injection pipe 42, as shown by the arrow A, is decreased. In addition, the air-fuel ratio is decreased to the stoichiometric value in order to effectively operate the three-way catalytic converter 20.

In the above-mentioned operation of the flow control valve 22, it is necessary to maintain a constant rate of movement of the valve member 50 toward or away from the valve seat 46, to effectively control the air-fuel ratio of the exhaust gas. The rate of movement of valve member 50 toward the valve seat 46, which is determined by the orifice 80, can be maintained at a constant value, since the atmospheric pressure is always substantially constant. However, the rate of the movement of the valve member 50 away from the valve seat 46, which is determined by the orifice 78, cannot be maintained at a constant value, since the vacuum level at the port 70 is not constant but varies in accordance with the change of the engine load. When the load of the engine is low, the opening of the not shown carburetor throttle valve is large. Thus, the vacuum level at the port 70 is high, so that the vacuum level in the vacuum chamber 58 of the flow control valve 20 is quickly increased, as shown by a line $m_1$ in FIG. 2a, causing a high rate of movement of the valve member 50.

When the load of the engine is low, the opening of the throttle valve is small and, thus, the vacuum level at the port 70 is small. As a result, the vacuum level in the vacuum chamber 58 of the flow control valve is slowly increased, as shown by a line $m_2$ in FIG. 2b, causing a slow rate of movement of the valve member 50.

Consequently, if no means are provided for compensating for the difference in the rate of increase of vacuum level in the chamber 58 between the high and low load conditions, the rate of increase of the amount of secondary air directed to the air injection pipe 42, as shown by the arrow A, during the low load condition becomes higher than the rate of increase of the amount of secondary air during the high load condition. As a result, an effective control of the air-fuel ratio of the exhaust gas to the stoichiometric value is not carried out and, in turn, an effective operation of the three-way converter 20 cannot be achieved.

According to the present invention, a vacuum mechanism, which is described below, is provided for maintaining a substantially constant rate of movement of the valve member 50 of the flow control valve 22. In FIG. 1, a second vacuum signal chamber 100 is formed on the opposite side of the main vacuum signal chamber 58 by a bellows member 102 and the diaphragm 54. The second vacuum chamber 100 is connected, via vacuum conduits 104 and 106, to the vacuum conduit 68 connecting the first port 66 of the valve 60 with the vacuum port 70. The vacuum conduit 104 is connected to an air conduit 108 opened to the atmosphere. Orifices 110 and 112 are formed in the conduits 106 and 108, respectively. The inner diameters of the orifices 110 and 112 are determined so that a substantially constant rate of movement of the valve member 50 is maintained, as is described in detail below.

When the engine is operating under a low load condition, the vacuum level 70 of the vacuum signal port 70 is high, since the degree of throttle opening is small. The high level vacuum signal passing through the orifice 110 at a controlled rate is dropped, when the signal is received by the second chamber 100, by introduction of air into the chamber 100 via the orifice 112, so that the vacuum level in the chamber 100 is changed, during the low load condition, as shown by a line $l_1$ in FIG. 2a.

Therefore, the vacuum pressure difference between the first and second chambers 58 and 100, which corresponds to the rate of movement of the valve member 50 away from the valve seat 46, is changed, as shown by a line $n_1$, after the vacuum switching valve is switched to its first position.

When the engine is operating under a high load condition, the vacuum level of the vacuum port 70 is low, since the degree of the throttle opening is large. Therefore, the level of vacuum in the chamber 100 becomes also low. The low level vacuum signal is dropped, when the signal is received by the second chamber 100, by the introduction of air into the chamber 100 via the orifice 112, so that the vacuum level in the chamber 100 is, during the high load condition, changed as shown by a line $l_2$ in FIG. 2b. Therefore, the pressure difference between the first and second chambers 58 and 100 corresponding to the rate of the movement of the valve member 50 is changed as shown by a line $n_2$ in FIG. 2b. As will be clear from FIGS. 2a and 2b, the lines $n_1$ and $n_2$ are substantially the same. Therefore, according to the present invention, the rate of movement of the valve member 50, corresponding to the rate of increase of vacuum force of the diaphragm, is maintained at a substantially constant value irrespective of the engine load condition. As a result, an ideal air-fuel ratio control operation can be carried out by the flow control valve 22, which causes the three-way converter 20 to effectively eliminate three major toxic components.

Figure 3:
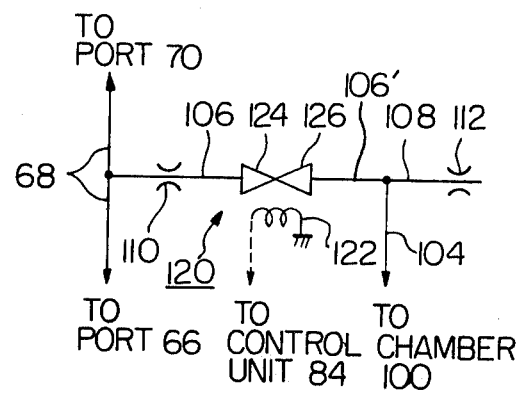
FIG. 3 is a partial view of another embodiment of the present invention.

In a modification of the above described embodiment, as illustrated in FIG. 3, an electromagnetic valve 120 is arranged on vacuum tubes 106 and 106'. The valve 120 has two ports 124 and 126, and a solenoid coil 122 which is electrically connected to the control unit 84. The valve 120 is located so that the ports 124 and 126 are connected with each other when the solenoid 122 is energized. The ports 124 and 126 are disconnected from each other when the solenoid 122 is not energized. As already described, when the control unit 84 operates to provide an output signal, the vacuum switching valve 60 in FIG. 1 is in its first position, in which a vacuum signal at the port 70 is allowed to transmit to the chamber 58. Therefore, the embodiment of FIG. 3 is very advantageous, since a vacuum pressure is formed in the chamber 100 for maintaining a constant rate of movement of the valve member 50 when the member 50 is moved away from the valve seat 46.

What is claimed is:

1. An exhaust gas cleaning apparatus of an internal combustion engine having an intake system, an engine body and an exhaust system, said apparatus comprising:
   a three-way catalytic converter disposed in said exhaust system, said converter being operable for cleaning three major toxic components in the exhaust gas when an air-fuel ratio of the exhaust gas is maintained near a predetermined value;
   a pipe means for introducing secondary air into said exhaust system located upstream of said three-way catalytic converter;
   a vacuum-operated flow control valve device located on said pipe means, said valve device having a spring-urged diaphragm for forming a main vacuum signal chamber on one side of said diaphragm for moving said diaphragm, in accordance with a vacuum force applied thereto, to control the amount of secondary air directed to said exhaust system;

a sensor means arranged in said exhaust system for sensing the air-fuel ratio of the exhaust gas;

vacuum transmitting means responsive to electric signals from the sensor means for selectively transmitting a vaccum signal from a vacuum port formed in the intake system into said main vacuum chamber of the vacuum-operated flow control valve for controlling the vacuum level in the main vacuum chamber of the flow control valve; and vacuum introducing means for transmitting a vacuum signal from said vacuum port into a second vacuum chamber formed on the other side of said diaphragm opposite to said main chamber, so that vacuum pressure is formed in said second chamber for maintaining a substantially constant rate of movement of the diaphragm during all engine running conditions.

2. An exhaust gas cleaning apparatus according to claim 1, wherein said vacuum introducing means comprise:

vacuum conduit means, for connecting the second chamber with said vacuum port for introducing the vacuum signal of said port into the second chamber at a controlled rate, and air conduit means connected to said vacuum conduit means, for introducing atmospheric air into said vacuum conduit means at a controlled rate.

3. An exhaust gas cleaning apparatus according to claim 2, wherein said vacuum introducing means further comprise a valve means disposed on said vacuum conduit means for preventing the vacuum signal at the vacuum port from being transmitted into the second chamber when the first chamber is opened to the atmosphere.

* * * * *